Patented Feb. 6, 1951

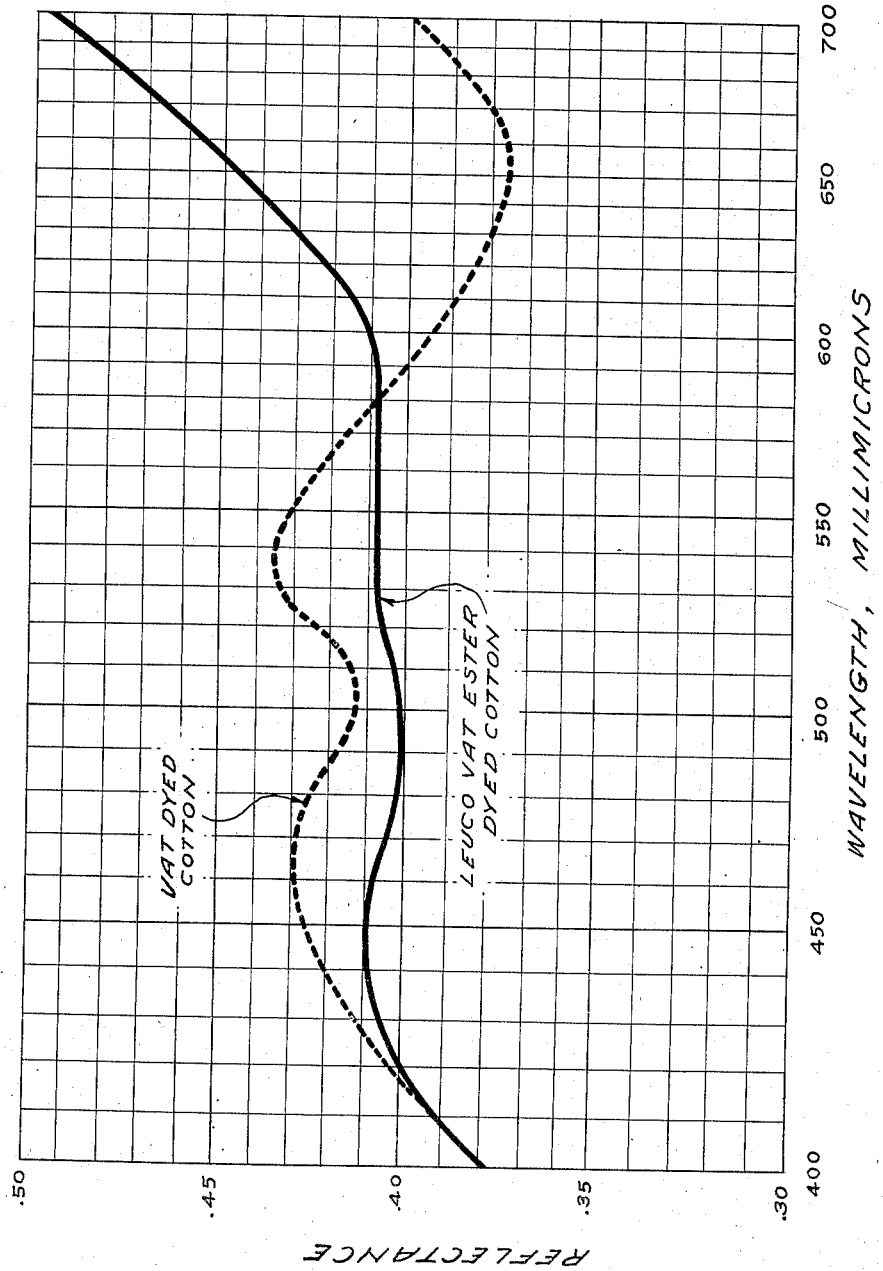

2,540,783

UNITED STATES PATENT OFFICE 2,540,783

LEUCO SULFURIC ESTER OF GRAY VAT DYE

William Baptist Hardy, Bound Brook, N. J., assignor to American Cyanamid Company, New York, N. Y., a corporation of Maine Application October 22, 1949, Serial No. 122,895

1 Claim. (Cl. 260—274)

This invention relates to a new neutral gray vat dyestuff and to a method of dyeing material therewith.

In the United States patent to Lytle, No. 2,456,589, there is described a greenish gray vat dyestuff prepared by chlorinating benzanthrone under specified conditions, condensing the product with alpha-aminoanthraquinone and subjecting the condensation product to alkali fusion. This dyestuff, the constitution of which is not fully known, dyes material such as cellulosic fabrics a greenish gray of excellent light fastness, good wash fastness and extraordinary peroxide fastness. Dyeing is by the conventional vat dyeing methods.

Many vat dyestuffs in the form of their leuco compounds have been transformed into soluble products by forming them into sulfuric acid half esters. These soluble esters of leuco vat dyestuffs may be applied to fabrics, or other materials, by printing, or padding processes, and are then fixed on the material by oxidation which hydrolizes the ester and oxidizes the leuco compound to the insoluble vat dyestuff. Despite the higher cost of the leuco sulfuric esters, the process has found considerable use where it is desired to dye materials which are sensitive to the strong alkaline baths required in ordinary vat dyeing processes.

The two procedures of applying vat dyestuffs to material, that is by the ordinary vat dyeing or printing processes from strongly alkaline baths, and the process using leuco esters of vat dyestuffs, have been considered to be equivalents from the standpoint that the final dyestuff on the dyed material is chemically identical, regardless of which of the two alternative processes is used, and the color produced is also the same. In other words, the two types of processes are different methods of obtaining the same final result.

The present invention depends on the discovery that the leuco sulfuric half ester of the greenish gray vat dyestuff of United States Patent 2,456,589, when used to dye material by the ordinary procedure employed with leuco esters, does not produce the same color which is obtained when the greenish gray vat dyestuff is dyed by ordinary vat dyeing procedures. The color obtained, instead of being greenish gray, is a pure neutral gray with no green in it whatsoever. The color is so entirely different that it is obvious that the leuco vat dye portion of the sulfuric ester molecule is not of the same constitution as in the free dyestuff or its ordinary leuco compound, and the final oxidized dye on the fabric is likewise different in constitution because it is of an entirely different color.

The change in color when the dyeing is effected with the leuco sulfuric ester, and which departs from the experience of the art with all other leuco esters, obviously is due to a change in composition. It is probable that the formation of the leuco compound and its esterification produces a chemical reaction with the rest of the dyestuff molecule which changes its chemical constitution. Just what this chemical change is, and what reaction mechanism produced it, is unknown. The change is there, the products are different compounds, and it is not intended to limit the present invention to any theory as to just what the change in chemical composition is, or how it is formed.

There is no change from the standard operating procedure with other vat dyestuffs, either in the formation of the leuco compound, or in its esterification to form the sulfuric acid half ester. It is an advantage of the present invention that the well-known manipulative process steps may be used without substantial change and without requiring any particular critical conditions. The change in constitution of the leuco ester, which is such a striking contrast to the ordinary experience of the art, appears to be a unique characteristic of the raw material used, that is to say, the original vat dyestuff itself, and does not appear to depend on any special reaction conditions. For example, the production of the leuco ester may be effected in a single reaction medium by means of reducing metals in a pyridine-chlorosulfonic acid solution, or the leuco compound of the vat dyestuff may first be made and then esterified in the normal way in an aqueous solution by the action of tertiary amine addition products of sulfuric trioxide as described in United States Patent 2,403,226.

The application of the leuco sulfuric ester to the fabric offers no special problems and is carried out by the normal procedures for dyeing with leuco esters. No new techniques have to be learned, and no special critical conditions need be observed in the dyeing. This is an advantage of the present invention and a further advantage lies in the fact that although the color obtained is entirely different, being free from green, the other desirable characteristics of a material dyed with the greenish gray vat dyestuff itself are retained; that is to say, there is no loss of the good fastness properties against light, washing and peroxide.

The drawing shows a pair of spectrophotometric curves of a cellulosic fabric dyed with the vat dye and with the leuco ester of the present application.

The invention will be described in greater detail in the following example. Parts are by weight.

Example

To 1200 parts of dry pyridine at 20° C. there is gradually added 186 parts of chlorosulfonic acid followed by 150 parts of the finely-powdered greenish gray vat dyestuff of United States Patent 2,456,589, which is prepared by chlorinating benzanthrone of 85-100% concentration at temperatures between 10 and 50° C. until a sample precipitated by water shows a chlorine content between 11.5 and 13.5%, discontinuing the chlorination, recovering the chlorinated benzanthrone mixture, and condensing the chlorinated benzanthrone mixture with approximately one molecular equivalent of alpha-aminoanthraquinone in nitrobenzene reaction medium in the presence of an acid-binding agent and a cupriferous catalyst to produce a mixture of secondary amines, recovering the amines so produced, and subjecting them to fusion with alcoholic caustic alkali and recovering the vat dyestuff produced. During the addition of the vat dyestuff, the temperature rises to approximately 30° C., and there is then gradually added 75 parts of iron powder at a temperature of 42-45° C., the mixture being stirred after addition of all of the material until reaction is substantially complete. The reaction mixture is then drowned in 9000 parts of water containing 390 parts of soda ash. The pyridine is removed by vacuum distillation, the residue diluted to the volume of 6500 parts of water heated to 60° C. and filtered with a siliceous filter aid. The filter cake is then washed with 0.5% soda ash solution, and the filtrate and washing salted at 60° C. with 2520 parts of sodium chloride. The leuco sulfuric half ester precipitates out and is filtered at 25° C. and washed with a soda ash, sodium chloride solution.

When cotton is padded, or printed, with the leuco ester and developed in the normal manner, attractive grays of a neutral shade are obtained, instead of the greenish grays which are obtained by dyeing in the usual vat dyeing process with the vat dyestuff of United States Patent 2,456,589. Although the color is entirely different, the other desirable properties of excellent light fastness, good wash fastness, and extraordinary peroxide fastness are shared by both colors.

The drawing shows two spectrophotometric curves of the dyed cotton. The solid line curve is that of the material dyed with the leuco ester, and the dotted line curve the same material dyed with the vat dye itself. The curves have been superposed in the drawing starting at the same reflectance in the violet so that their shapes, which determine the color, can be compared directly. It will be noted that the two curves are so different that they represent different colors and not minor shade differences. The dotted line curve is distinctly green, showing relatively high reflectance in the blue-green portion of the spectrum, with a dropping off in reflectance both in the violet and the red. The solid line curve is a true gray with an almost uniform reflectance through blue-green and yellow, and showing a marked increase in reflectance in the red instead of the decrease in the case of the other curve.

I claim:

A sulfuric acid half ester of the leuco form of a vattable dyestuff produced by chlorinating benzanthrone in sulfuric acid of 85-100% concentration at temperatures between 10° and 50° until a sample precipitated by water shows a chlorine content between 11.5 and 13.5%, discontinuing the chlorination and recovering the so-chlorinated benzanthrone mixture containing 11.5 to 13.5% combined chlorine thus obtained, condensing the said chlorinated benzanthrone mixture with approximately one molecular equivalent of alpha-amino-anthraquinone in nitrobenzene in the presence of an acid-binder and a cupriferous catalyst to produce a mixture of secondary amines and recovering the mixture of secondary amines so produced and subjecting said mixture of secondary amines thus produced to fusion with alcoholic caustic alkali.

WILLIAM BAPTIST HARDY.

REFERENCES CITED

The following references are of record in the file of this patent:

UNITED STATES PATENTS

| Number | Name | Date |
|---|---|---|
| 2,456,589 | Lytle | Dec. 14, 1948 |

OTHER REFERENCES

Whittaker and Wilcock Dyeing With Coal Tar Dyestuffs, 4th ed., 1942 (Baillier, Tindall and Cox, London), pp. 217-224.